Oct. 16, 1956 J. K. HOOKS 2,766,708
PLANTING AND SIDE DRESSING ATTACHMENT FOR TRACTORS
Filed Oct. 24, 1952 4 Sheets-Sheet 1

INVENTOR.
JORDAN K. HOOKS
BY

McMorrow, Berman + Davidson
ATTORNEYS

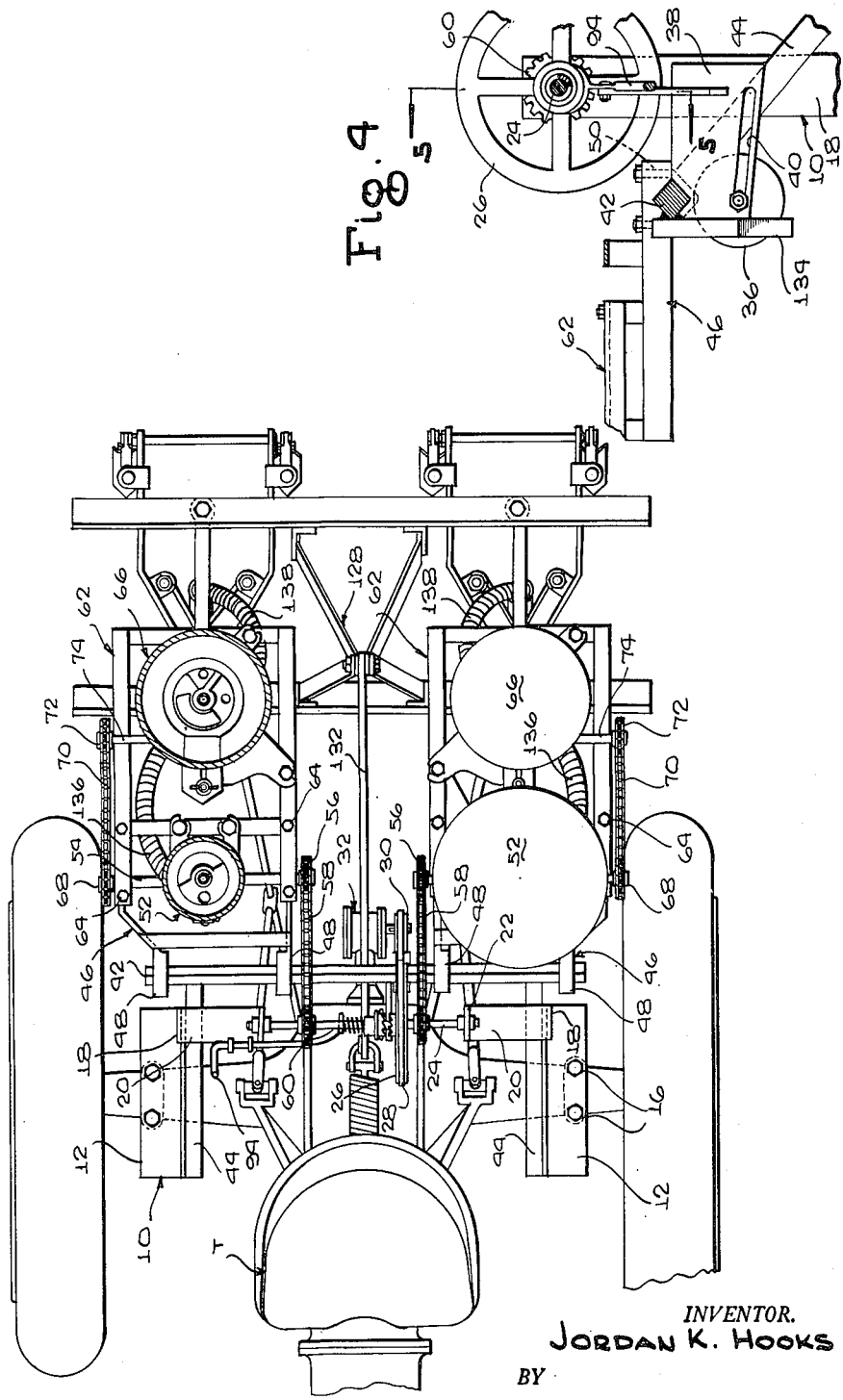

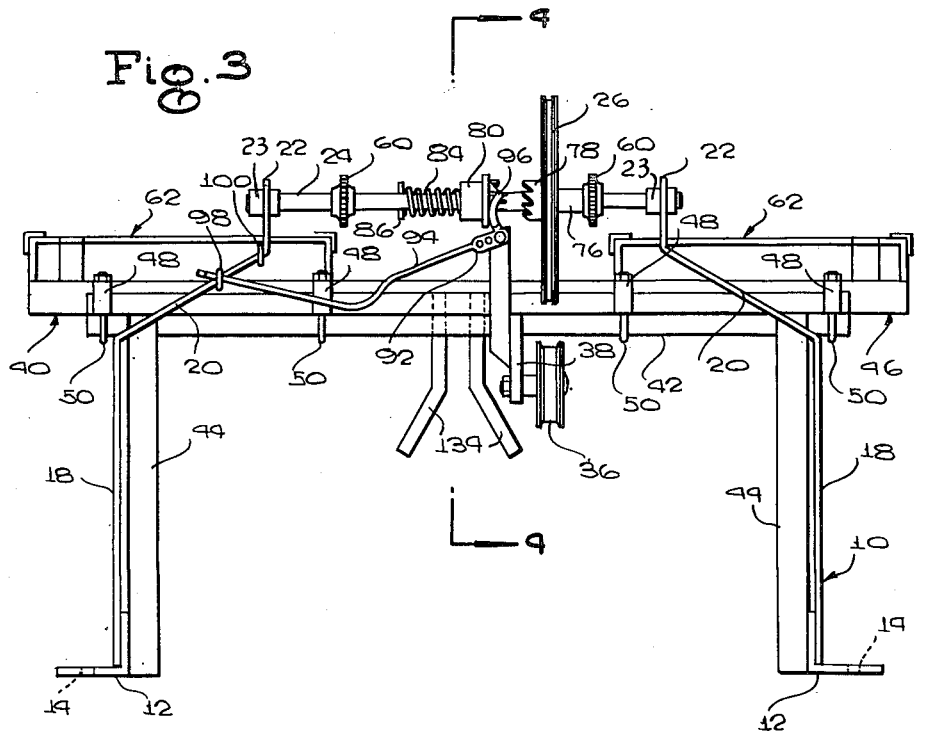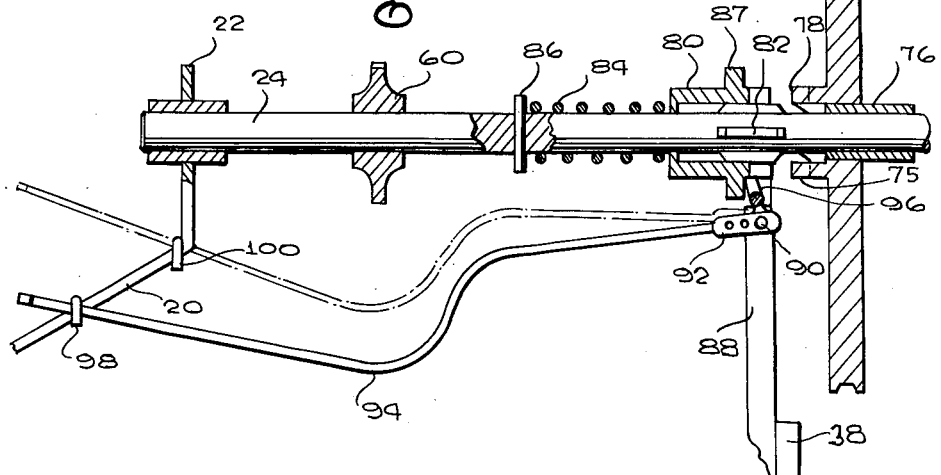

Oct. 16, 1956 J. K. HOOKS 2,766,708
PLANTING AND SIDE DRESSING ATTACHMENT FOR TRACTORS
Filed Oct. 24, 1952 4 Sheets-Sheet 4

INVENTOR.
JORDAN K. HOOKS
BY
McMorrow, Berman & Davidson
ATTORNEYS

United States Patent Office 2,766,708
Patented Oct. 16, 1956

2,766,708

PLANTING AND SIDE DRESSING ATTACHMENT FOR TRACTORS

Jordan K. Hooks, Pitts, Ga.

Application October 24, 1952, Serial No. 316,667

2 Claims. (Cl. 111—59)

This invention relates to an improved planting and side dressing attachment for a tractor for use in planting, fertilizing, and cultivating operations.

An important object of the invention is to provide an attachment of the character indicated which is readily removable from a tractor on which it is mounted, without disturbing or removing cultivator or fertilizer means associated with the tractor.

Another important object of the invention is to provide a planting attachment of the type stated which does not interfere with the operation of cultivating or plowing attachments associated with a tractor, but which can whenever desired, be operated in cooperation with such cultivating or plowing attachments.

Another important object is to provide an attachment of the character stated which is characterized by the smooth operation thereof, and elimination of knocking, dragging, and sliding, these being deficiencies which are present in previous attachments used for the same purpose.

Still another object is to provide an attachment of the type stated wherein the seed to be planted can be spaced any desired distance apart, by making simple adjustments in the attachment.

Yet another object is to provide an attachment as stated whose weight does not bear upon an associated cultivator frame.

A further object of the invention is to provide an attachment of the type stated which is driven from the power takeoff of the tractor, through clutch controlled driving means readily accessible from the operator's seat of the tractor, the means being so designed as to be readily bolted to the tractor about the power takeoff of the tractor, said means including a specially designed speed reducing means.

Still another object is to provide an attachment of the character stated which is so designed as to permit the planter assembly thereof to be readily removed with a minimum amount of difficulty.

Still another object is to provide an attachment of the type stated in which the entire structure is elevated above the ground and above ground conditioning attachments on the tractor. The attachment being powered wholly from the tractor, without use of ground wheels or the like.

Other objects will appear from the following description, the claims appended thereto, and from the annexed drawings, in which like reference characters designate like parts throughout the several views, and wherein:

Figure 2 is a top plan view of Figure 1 with portions shown in section;

Figure 3 is a front elevational view of the attachment per se, as it appears when viewed from the left of Figure 1;

Figure 4 is a fragmentary vertical section taken on line 4—4 of Figure 3;

Figure 5 is an enlarged fragmentary sectional view taken substantially on line 5—5 of Figure 4, the full and dotted lines showing inoperative and operative positions, respectively, of a clutch means;

Figure 1:
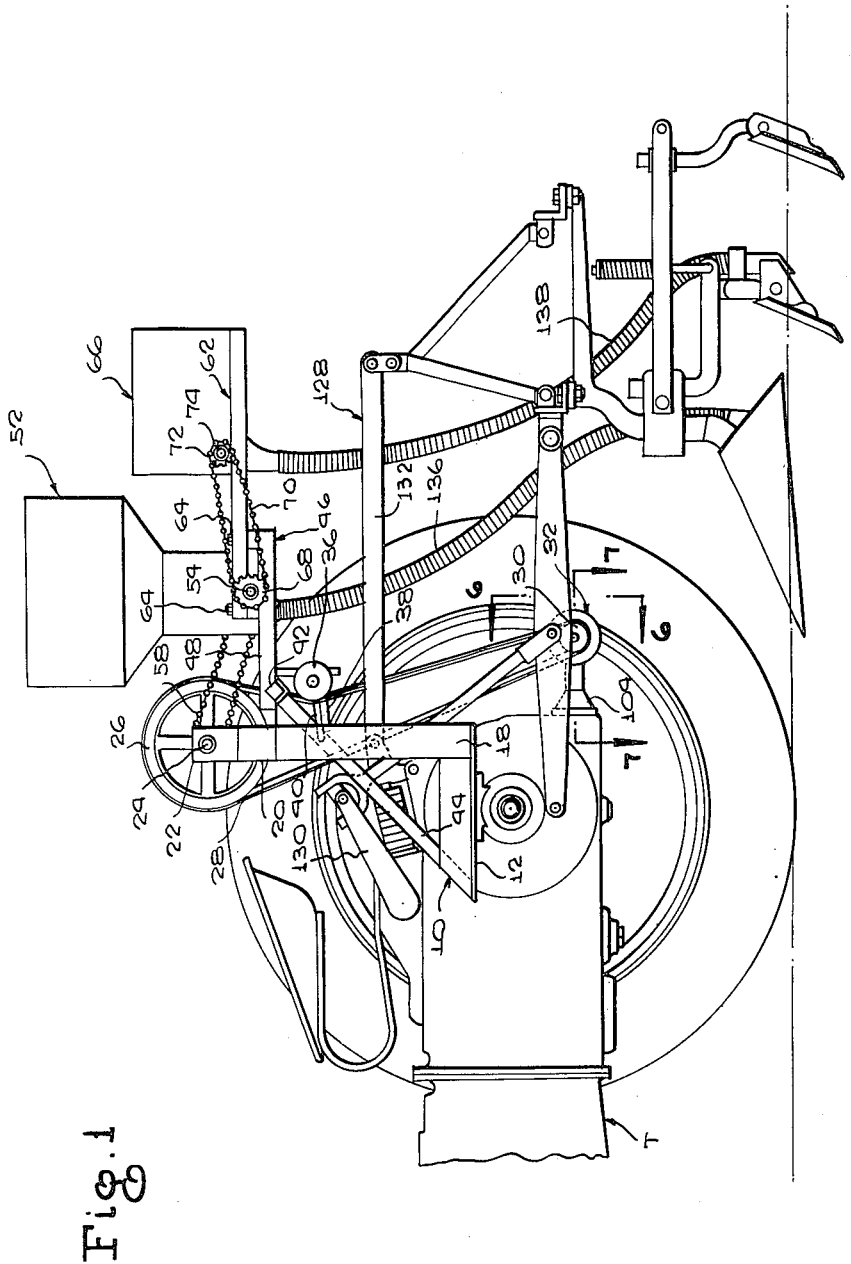
Figure 1 is a fragmentary side elevational view of a tractor having a cultivator attachment thereon, and showing a planting attachment associated therewith in accordance with the present invention.

Referring in detail to the drawings, the reference letter T generally designates a conventional tractor of well known make. An attachment according to the present invention, is adapted to be bolted to the rear end portion of said tractor, below the tractor fenders, and includes a stationary, upstanding, supporting frame designated generally by the reference numeral 10. The supporting frame 10 comprises a pair of horizontally disposed angle iron base plates 12 arranged in parallelism at opposite sides of the mid width portion of the tractor, as best shown in Figure 2, and having openings 14 receiving bolts 16, whereby the base plates are fixedly attached to the rear axle housing of the tractor.

Welded or otherwise fixedly secured to the rear ends of the base plates 12 are standards 18 formed of flat bar stock. The standards 18 have laterally inwardly and upwardly angulated upper portions 20 (see Figure 3) terminating at their upper ends in vertically extended terminals 22.

The terminals 22 are provided with coaxially aligned sleeve bearings 23, in which are journaled the opposite ends of a countershaft 24 disposed horizontally and extending transversely of the frame 10 between the standards 18.

Figure 6:
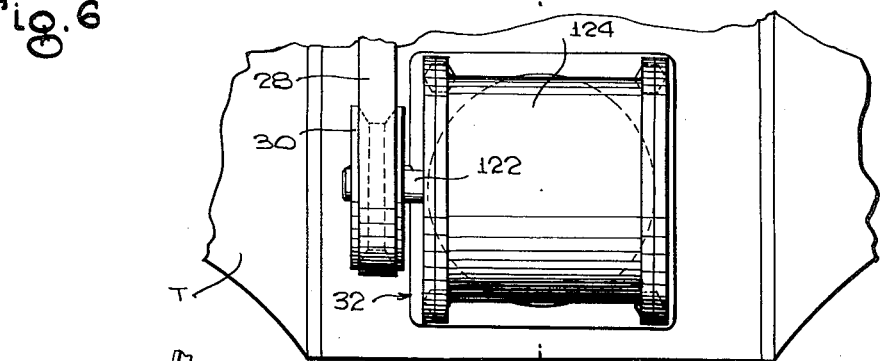
Figure 6 is an enlarged fragmentary sectional view on line 6—6 of Figure 1, showing the gear box of the attachment in rear elevation.

Sleeved upon the countershaft 24, so as to be rotatable relative to the countershaft, is a driven pulley 26, around which is trained a belt 28, said belt 28 being passed about and driven by a drive pulley 30 (Figure 6) disposed laterally of and carried by gear box 32.

Figure 7:
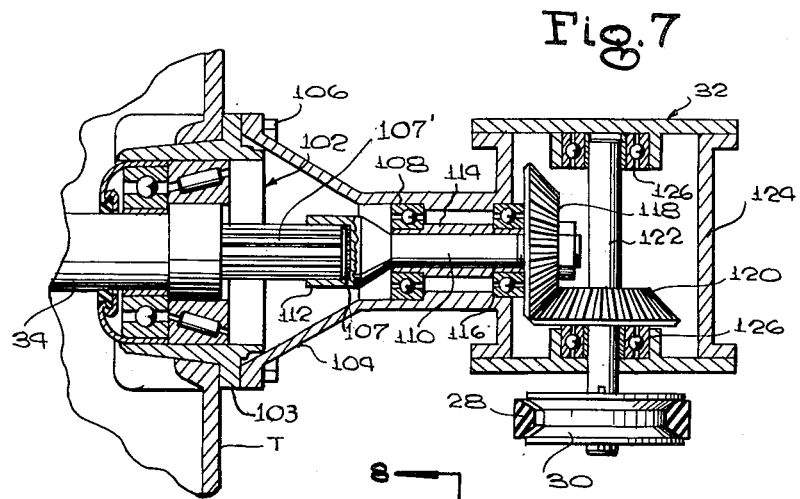
Figure 7 is an enlarged fragmentary sectional view taken substantially on line 7—7 of Figure 1.

The gear box, as shown in Figure 7, is mounted around and receives the power takeoff shaft 34 of the tractor whereby the drive pulley 30 is rotated responsive to rotation of the power takeoff shaft. The gear box 32 is described in detail hereinafter.

For the purpose of maintaining the belt 28 under adjusted tension, I provide, as shown in Figures 3 and 4, an idler pulley 36 which is mounted upon an idler pulley bracket 38 having a horizontal slot 40 and bears against the rear flight of the belt 38. The slot 40 receives a stub shaft 29 on which the idler pulley is rotatably mounted.

The idler pulley bracket 38 is welded or otherwise fixedly secured to, and depends from, the intermediate portion of a cross bar 42 (Figures 3 and 4), extending transversely of the frame and constituting a part of the frame. The cross bar 42 is disposed in parallelism with the countershaft 24, and has its ends fixedly secured to the upper ends of rearwardly inclined cross bar supports 44. The cross bar supports 44 are fixedly secured, at their lower ends, to related ones of the base plates 12, and project upwardly and rearwardly from said base plates as best shown in Figure 1.

The cross bar 42 is arranged as a support for a pair of fertilizer and planter support brackets 46 which are open rectangular horizontal frames having their side bars 48 overlying the cross bar 42 at the opposite ends of the cross bar, and clamped to said cross bar by means of U clamps 50.

The support brackets 46 project rearwardly from the cross bar 42, and are disposed in horizontal planes, to receive fertilizer assemblies, designated generally by the reference numeral 52. The fertilizer assemblies are of conventional construction, and accordingly, are not illustrated in detail herein.

The fertilizer assemblies 52 have fertilizer drive shafts 54 associated therewith, the drive shafts 54 being journaled at their opposite ends on the opposite side bars 48 of the support brackets 46. On the inner end of each drive shaft 54 is secured a sprocket 56 (Figure 2) about which is trained a chain 58, said chain 58 being trained about a sprocket 60 secured to the countershaft 24 for rotation therewith.

Removably and fixedly mounted on and projecting rearwardly beyond each fertilizer support bracket 46 is a planter support bracket 62. Each planter support bracket 62, like its associated fertilizer support bracket, is formed as an approximately rectangular, open frame having side bars 63 detachably secured by bolts 64 to the related side bars 48 of the fertilizer brackets 46.

Each of the planter support brackets 62 supports a planter of conventional construction designated generally at 66, and for the purpose of driving the shaft 67 of the planter 66, the outer end of the fertilizer drive shaft 54 of the related fertilizer assembly has secured thereto a sprocket 68 about which is trained a chain 70 trained about a planter drive sprocket 72 secured to the planter drive shaft 74.

A clutch controlled means is provided for transmitting power to the shafts of the fertilizers and planters, said clutch assembly being illustrated in detail in Figure 5.

As mentioned hereinabove, the driven pulley 26 is sleeved upon and is rotatable relative to the countershaft 24. The driven pulley is rotatably mounted on a sleeve 76 which is secured to the countershaft 24. The sleeve 76, Figure 3, also carries a sprocket 60 about which is trained a chain 58, the chain being also trained about a sprocket 56 carried by the drive shaft 54 of the other assembly 52, Figure 2. The driven pulley 26 has a hub 75 formed with an annular series of clutch teeth 78.

The clutch teeth 78 are adapted to engage with a complementary series of clutch teeth 79 formed upon a clutch sleeve 80 circumposed about the countershaft 24. The clutch sleeve 80 is secured to the countershaft 24 for rotation therewith, but is slidable longitudinally of the countershaft toward and away from driven pulley clutch teeth 78, the countershaft 24 having keys 82 engaging in complementary keyways 83 formed in and disposed longitudinally of the clutch sleeve 80.

A helical spring 84 is circumposed about the countershaft 24, and is compressed between a cross pin 86 extending through the countershaft 24 and the adjacent end of the clutch sleeve 80 and urges said clutch sleeve into engagement with the driven pulley teeth 78.

Fixedly secured to the slotted bracket 38 on which the idler pulley 36 is mounted is an upstanding lever support bracket 88, said bracket 88 having a pivot pin 90 at its upper end on which is pivotally mounted one end 92 of an elongated operating lever 94. As will be noted from Figure 5, the end 92 of the lever 94 is formed with a longitudinal series of apertures, any of which is adapted to receive the pivot pin 90, for adjustment of the lever 94 upon the support bracket 88.

Rigid with the end 92 of the lever 94 is a yoke 96 straddling the shaft 24 and engaging a collar 87 formed upon the end of the clutch sleeve remote from the spring 84.

The lever 94 is shiftable between operative and inoperative positions, the inoperative position of the lever being shown in full lines in Figure 5. In this position of the lever 94, the other or free end of the lever 94, which constitutes a handle accessible from the operator's seat of the tractor T, is engaged through a keeper 98 secured to the portion 20 of one of the standards 18.

When it is desired to shift the clutch sleeve 80 into engagement with the driven pulley clutch teeth 78, the lever 94 is disengaged from its keeper 98, and is swung upwardly to the dotted line position shown in Figure 5. In this position of the lever, the lever is engageable in a keeper 100.

It will be seen that when the lever 94 is swung to its dotted line position in Figure 5, the spring 84 is free to expand, and urges the clutch sleeve teeth 79 into engagement with the driven pulley teeth 78. This has the effect of coupling the countershaft 24 to the driven pulley 26, for rotation jointly therewith.

When the clutch sleeve is engaged the sprocket 60 is rotated, so as to drive the shafts of the fertilizers and planters.

The gear box 32 is provided for rotating the driven pulley 26 at a selected rate of speed.

Figure 8:
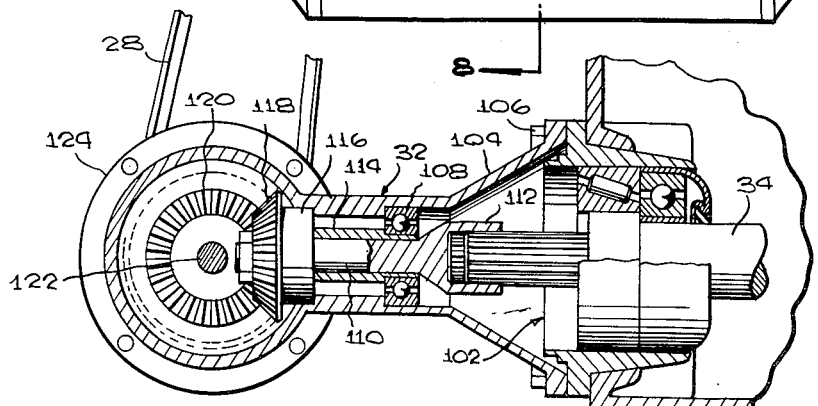
Figure 8 is a sectional view taken substantially on line 8—8 of Figure 6.

As shown in Figures 7 and 8, the tractor power take-off shaft 24 is journaled for rotation in a bearing designated generally at 102, said bearing being mounted on the rear end portion of the tractor in a flanged housing 103. The gear box 32 includes a shaft housing 104 having a belled, circumferentially flanged end apertured to receive mounting bolts 106 threadedly engaged in the flange of the bearing housing 103.

Mounted within the housing 104, intermediate the opposite ends thereof, is a bearing 108, in which is journaled a transmission shaft 110, said shaft 110 having on one end a socket 112 formed with spline grooves 107 receiving splines 107′ conveniently provided on the power take-off shaft.

The shaft 110 extends through a spacer sleeve 114, said sleeve abutting at its opposite ends against the bearing 108 and against another bearing 116 mounted in the inner end of the housing 104.

The end of the shaft 110 remote from the socket 112 has thereon a beveled gear 118, in mesh with a complementary beveled gear 120. Gear 120 is secured to a shaft 122 extending transversely between and journaled in bearings 126 on the opposite ends of a cylindrical gear housing 124.

One end of the shaft 122 projects beyond its associated end of the housing 124, on which the drive pulley 30 is secured.

The gear box 32 can be swiftly bolted to the power takeoff shaft bearing housing, and can be detached from said housing with equal facility. The act of bolting the gear box to the power takeoff shaft bearing housing disposes the inner parts of the gear box in operative relationship to the power take-off shaft.

The above described attachment can, if desired, be used in association with a conventional cultivator attachment designated generally at 128 (Figure 1) on the tractor T. The cultivator attachment is raised and lowered to inoperative and operative positions, respectively, by the power lift arm 130 of the tractor, the cultivator attachment having a center bar 132 extending longitudinally and centrally thereof, at its upper end.

When the cultivator attachment is elevated, it is desirable that it be stabilized in its raised position. To this end, I provide stabilizer arms 134 (Figure 3) secured at their upper ends fixedly to the mid length portion of the cross bar 42. As will be noted from Figure 3, the stabilizer arms 134 depend from the cross bar 42, and have downwardly divergent lower end portions, said lower end portions being adapted to receive the center bar of the cultivator when the cultivator attachment is elevated to an inoperative position.

This is a highly desirable characteristic of the structure, since it holds the cultivator attachment in a fully stabilized condition when the tractor reaches the end of a row and is turning to proceed down an adjacent row or rows.

When the device is in use, fertilizer is deposited upon the ground through flexible tubes 136 extending downwardly from the fertilizer hoppers. At their lower ends the flexible tubes 136 are clamped or otherwise secured to selected portions of the cultivator attachment 128.

Seed being deposited by the planters 66 is dropped through flexible tubes 138 extending downwardly from the planters and clamped or otherwise attached at their lower ends to selected parts of the cultivator attachment 128.

The construction, as will be apparent, in such as permits the fertilizer and planter assemblies to be used simultaneously. Further, it will be seen that the planters can be removed entirely when the crops have been planted, leaving the fertilizer hoppers in place. The fertilizers can, if desired, be left permanently upon the rear end of the tractor, and it will be seen that said fertilizer assembly will not interfere in any way with normal use of the cultivator 128. When, however, it is desired to use the fertilizer assembly for side dressing, this can be done at any time.

The construction has been found to be usable to particular advantage on certain makes of tractors, and when so used, does not knock, drag, or slide. Further, the planting and side dressing attachment imposes no weight whatever on the cultivator frame, and it has been found to be additionally an important characteristic of the invention that the arrangement permits this attachment to be used in association with a conventional cultivator 128, or without the cultivator, whichever is desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In combination, a tractor having a rear end, a power take-off shaft on said rear end, and a rear axle housing extending crosswise of said rear end, a vertical frame comprising standards having lower ends fixed to the axle housing at opposite sides of said rear end, said standards having upper ends, a cross bar extending between and secured to said upper ends, first horizontal rectangular frames fixed on said cross bar and extending rearwardly from said cross bar, said first frames being located at opposite ends of said cross bar and laterally spaced from each other, a planter hopper mounted on each of said first frames and having a shaft having inner and outer ends outside of the hopper and provided with sprockets, a second horizontal rectangular frame removably mounted on and extending rearwardly beyond said first frames, a fertilizer hopper mounted on each of said second frames and having a shaft having an outer end provided with a sprocket, sprocket chains trained over and operatively connecting the sprockets on the outer ends of the planter hopper shafts and the sprockets on the outer ends of the fertilizer hopper shafts, a transverse horizontal countershaft mounted rotatably on said vertical frame forwardly of said cross bar, said countershaft having a fixed sprocket thereon, a sprocket chain trained over said countershaft sprocket and the sprocket on the inner end of the shaft of one of the planter hoppers, a driven pulley rotatably and slidably mounted on said countershaft and having a sprocket, and over the chain trained over said pulley sprocket and over the sprocket on the inner end of the shaft of the remaining planter hopper, a spring pressed clutch sleeve non-rotatably and slidably mounted on said countershaft at one side of said driven pulley, facing sides of the clutch sleeve and driven pulley having a free end and another end, a clutch lever pivoted on said vertical frame and having a fork engaging the side of the clutch sleeve facing the driven pulley, the clutch sleeve normally being positioned to engage the teeth with the teeth of the driven pulley and said clutch lever being swingable from a normal position to another position in which the clutch sleeve teeth are disengaged from the driven pulley teeth, and means operatively connecting said driven pulley to the tractor power take-off shaft.

2. In combination, a tractor having a rear end, a power take-off shaft on said rear end, and a rear axle housing extending crosswise of said rear end, a vertical frame comprising standards having lower ends fixed to the axle housing at opposite sides of said rear end, said standards having upper ends, a cross bar extending between and secured to said upper ends, first horizontal rectangular frames fixed on said cross bar and extending rearwardly from said cross bar, said first frames being located at opposite ends of said cross bar and laterally spaced from each other, a planter hopper mounted on each of said first frames and having a shaft having inner and outer ends outside of the hopper and provided with sprockets, a second horizontal rectangular frame removably mounted on and extending rearwardly beyond said first frames, a fertilizer hopper mounted on each of said second frames and having a shaft having an outer end provided with a sprocket, sprocket chains trained over and operatively connecting the sprockets on the outer ends of the planter hopper shafts and the sprockets on the outer ends of the fertilizer hopper shafts, a transverse horizontal countershaft mounted rotatably on said vertical frame forwardly of said cross bar, said countershaft having a fixed sprocket thereon, a sprocket chain trained over said countershaft sprocket and the sprocket on the inner end of the shaft of one of the planter hoppers, a driven pulley rotatably and slidably mounted on said countershaft and having a sprocket, a sprocket chain trained over said pulley sprocket and over the sprocket on the inner end of the shaft of the remaining planter hopper, a spring pressed clutch sleeve non-rotatably and slidably mounted on said countershaft at one side of said driven pulley, the facing sides of the clutch sleeve and driven pulley having a free end and another end, a clutch lever pivoted on said vertical frame and having a fork engaging the side of the clutch sleeve facing the driven pulley, the clutch sleeve normally being positioned to engage the teeth with the teeth of the driven pulley and said clutch lever being swingable from a normal position to another position in which the clutch sleeve teeth are disengaged from the driven pulley teeth, and means operatively connecting said driven pulley to the tractor power take-off shaft, said means comprising gearing including a gear box removably mounted on the rear end of the tractor, a gear shaft in the gear box connected to the power take-off shaft, a drive pulley on said gear shaft, and a belt trained over said drive pulley and said driven pulley.

References Cited in the file of this patent

UNITED STATES PATENTS

| | | |
|---|---|---|
| 1,609,630 | Newton | Dec. 7, 1926 |
| 2,092,608 | Lindgren et al. | Sept. 7, 1937 |
| 2,210,994 | White | Aug. 13, 1940 |
| 2,230,331 | Mobley | Feb. 4, 1941 |
| 2,319,737 | Johnson | May 18, 1943 |
| 2,337,749 | Hand | Dec. 28, 1943 |

OTHER REFERENCES

McCormick Deering Combination Planters No. HM-96, Oct. 8, 1945.

Ferguson-Sherman Corporation, FS4008, Oct. 23, 1942.